United States Patent [19]
Liu et al.

[11] Patent Number: 6,020,664
[45] Date of Patent: Feb. 1, 2000

[54] ELECTRIC SPINDLE MOTOR

[75] Inventors: Zhejie Liu; Mohammed Abdul Jabbar; Qide Zhang; Teck Seng Low; Shixin Chen; Yuen Ann Mah, all of Singapore, Singapore

[73] Assignee: Data Storage Institute, Singapore, Singapore

[21] Appl. No.: 09/313,809

[22] Filed: May 18, 1999

Related U.S. Application Data

[63] Continuation of application No. 08/887,738, Jul. 3, 1997.

[30] Foreign Application Priority Data

Jul. 6, 1996 [SG] Singapore ............................ 9610228-0

[51] Int. Cl.[7] ....................................................... H02K 7/08
[52] U.S. Cl. ............................. 310/90; 310/89; 310/90.5; 310/52; 384/107; 384/100; 384/112; 384/113; 384/123; 384/132; 384/133
[58] Field of Search ................................... 310/90, 89, 91, 310/52, 90.5; 384/107, 100, 112, 113, 123, 132, 133

[56] References Cited

U.S. PATENT DOCUMENTS

| | | | |
|---|---|---|---|
| 5,283,491 | 2/1994 | Jabbar et al. .............................. | 310/90 |
| 5,714,828 | 2/1998 | Ackermann et al. ..................... | 310/254 |
| 5,751,085 | 5/1998 | Hayashi .................................... | 310/90 |
| 5,763,967 | 6/1998 | Kurosawa et al. ........................ | 310/45 |
| 5,770,906 | 6/1998 | Hazelton et al. ......................... | 310/90 |
| 5,835,124 | 11/1998 | Fukita et al. ............................. | 347/260 |
| 5,847,479 | 12/1998 | Wang et al. .............................. | 310/90 |

*Primary Examiner*—Clayton LaBalle
*Assistant Examiner*—Thanh Lam
*Attorney, Agent, or Firm*—Oppenheimer Wolff & Donnelly LLP

[57] ABSTRACT

An electric spindle motor has a base assembly (19) and a hollow notatable hub (16) housing a motor. The hub (16) is mounted for rotation about an axis and a stator (12) is mounted on the base assembly (19) inside the hub (16). A liquid filled journal bearing (11, 21) acts between the base assembly (19) and the hub (16) to provide radial support of the hub (16). A gas filled thrust bearing (26, 27, 35) also acts between the hub (16) and base assembly (19) to provide at least axial support of the hub (16).

32 Claims, 5 Drawing Sheets

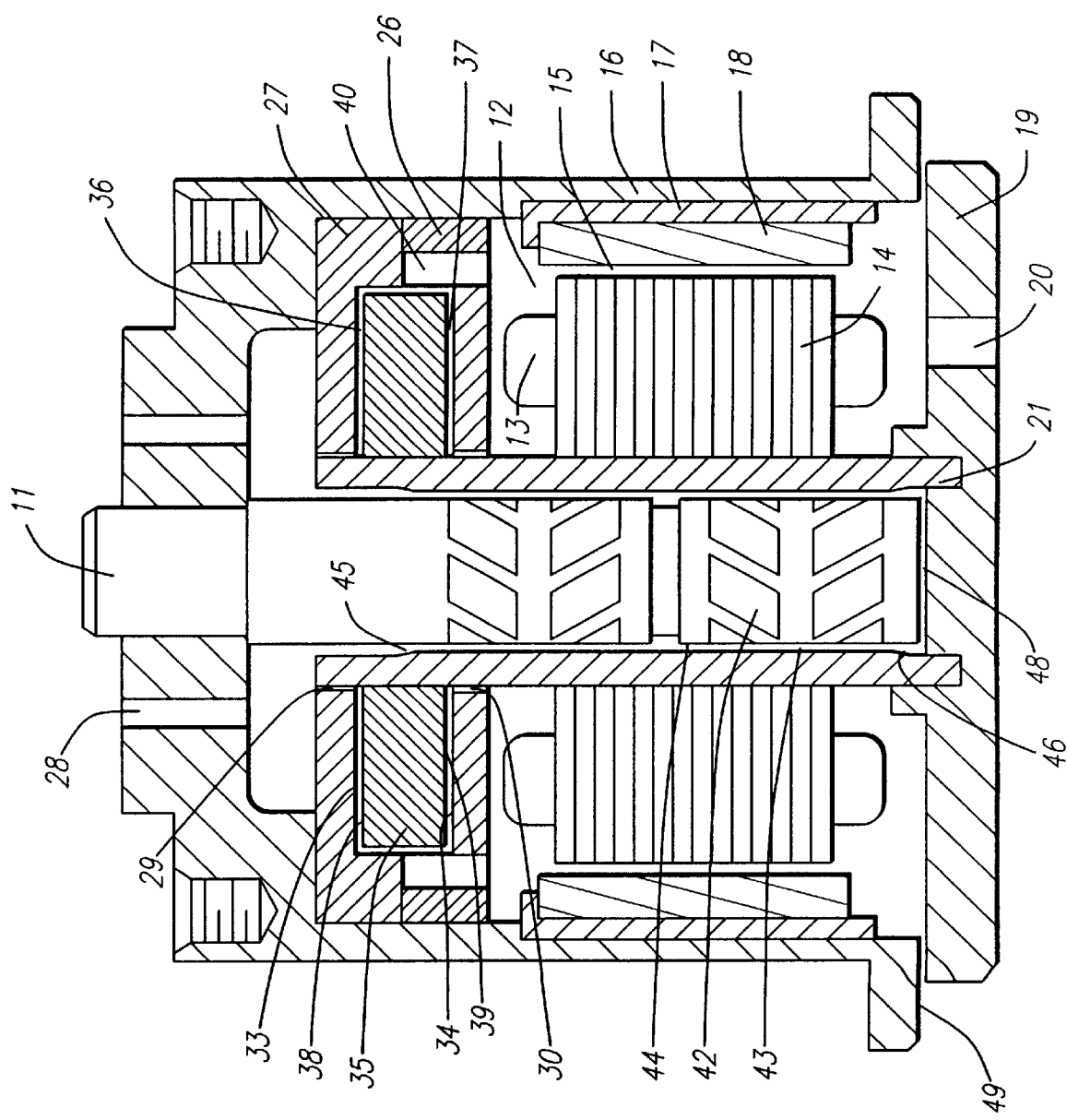

ELECTRIC SPINDLE MOTOR

This application is a continuation of Ser. No. 08/887,738 filed Jul. 3, 1997.

TECHNICAL FIELD

This invention relates to electric spindle motors of the kind used for magnetic disk drives. Although the invention will hereinafter be described with reference to a spindle motor for hard disk drives, the spindle motor of this invention is also suitable for use in other applications where high speed precision spinning motion is required.

BACKGROUND ART

Disk drives are a commonly used data storage device which utilise magnetic medium. It is required that the disk drive spindles have a low magnitude of random vibration in both the axial and radial directions. In addition, the basic requirements for practical magnetic recording devices are: high stiffness, especially in the radial direction, high shock resistance, and being capable of operating normally despite the orientation of the spindle axis. As consumer demands for the computer products, in particular personal computers, continuously push the advances of the magnetic recording technology towards miniaturisation, high storage capacity, and fast data transfer rate, the shortcomings of the conventional ball bearing supported spindle assembly becomes more and more acute. Major problems with the usage of a ball bearing spindle assembly are its high level of non-repeatable-runout (NRR), and wear rate. Because of the non-uniformity and geometric imperfectness of bearing balls, inner and outer races, unpredictable runout can occur during operation. This represents the main constrains for the data storage track width which has to accommodate the magnitude of the irregular vibration in the radial and the axial directions. As a result, the maximum achievable track density is limited primarily by the level of NRR. In practice, pre-loading of the ball bearing system of the spindle is used to reduce the NRR. However, excessive pre-loading force causes further increase in the wear rate and frictional losses, whilst any further miniaturisation of the disk drives necessitates lower power losses since heat dissipation becomes more difficult.

Another shortcoming of ball bearing spindle motors is that a seal mechanism is required to prevent any wear debris, dust, foreign bodies and evaporated substances from exhaling out of the bearings and contaminating the magnetic data storage media. The performance of this seal mechanism tends to degrade with increased wear and it is therefore not suitable for high speed applications. A further limitation arises with prior art ball bearing systems because scalable reduction of the size of the ball bearing structures is subject to unavoidable limitations and cannot always fit in the progressively miniaturised disk drives.

Fluid film bearings (FFB) appear to be a promising alternative to satisfy the demands for high precision spindles suitable for high capacity magnetic recording systems. In a self-acting FFB system, the bearing surfaces are kept separated by a lubricant film. That is, there is no metal to metal rubbing during operation, and therefore a comparatively low wear rate. The most outstanding feature of this bearing structure, however, is that it provides extremely low NRR spinning, as compared with the ball bearing spindle. The spindle motor structure described in U.S. Pat. No. 4,200,344 to Binns is one of the earliest inventions which makes use of the FFB technology. Like many others, for example, that described in U.S. Pat. No. 4,656,545 to Kakuta, it operates unidirectional, which limits the commercial applications as modern disk drives are required to operate regardless the shaft orientation.

One particular problem with the application of the cylindrical FFB journal bearing system is that it may lose its stability during operation. This is because the radial stiffness of the FFB journal bearing is low when the radial load is small, for example, when the spindle axis is vertically oriented. A particular consequence is instability due to sub-rotating-frequency whirl. As an economic and effective approach to achieve an enhanced bearing stability, tapered or conical bearings can be used. U.S. Pat. No. 4,734,606 to Hajec discloses electric motor constructions with tapered FFB lubricated by ferrofluid. Tapered air-lubricated FFB spindles for magnetic recording devices are described in the U.S. Pat. No. 5,283,491 to Jabbar.

With the application of liquid-lubricated FFB spindles, there comes the problem of sealing of the fluid. The bearing lubricant must be securely confined by a seal mechanism since leakage of lubricant into the space receiving the data storage disks causes contamination of the recording media and thus malfunction of the disk drives. Leakage of the lubricant can also cause degradation of the bearing performance, resulting in failure of the disk read and write processes of disk drive systems. The seal may also cause excess frictional loss, for example, if a contact seal is used. The seal must additionally be designed to withstand a high level of shock. Other design options using sophisticated sealing mechanisms may only be realised at a high manufacturing cost. An example of such a hard drive spindle is disclosed in U.S. Pat. No. 5,246,294 to Pan.

Gas (including air) lubricated bearing spindles which avoid the necessity to seal the lubricant are attractive. In another spindle unit described in the U.S. Pat. No. 5,127,744 to White et al., a part of the stationary shaft is fitted with a rotationary ceramic sleeve to form the journal bearing, whilst two disc-shaped ceramic thrust bearings are disposed at both ends of the bearing sleeve. A bearing structure of this kind, that is, two thrust hearings disposed at two ends of a journal bearing, occupies a significant portion of the space in the spindle hub. It may be suitable for use in the "underslung" topology for the spindle motor, in which the motor components are placed below the spindle hub.

In practice, gas lubricated bearing spindles suffer from the major weakness of difficulty in achieving sufficient stiffness. In this respect, the stiffness of the journal bearing is of far more concern since the required radial stiffness is not only critical but also, taking the magnetic disk drives by way of an example, must be higher than the required axial stiffness in many cases. Measures to enhance the rigidity of the air bearing system, for example, to reduce the bearing clearance, will inevitably increase the manufacturing cost. Furthermore, practical disk drives must be designed to withstand a high level of shock. When the rotating mass is large, for instance for high capacity disk drives which have a large number of disks, the stiffness constraint becomes more stringent. As a result, the utilisation of the self-acting FFB system lubricated fully by gas has been limited to cases where the passive load is relatively light, for example, the spindle of the polygon mirror scanners.

DISCLOSURES OF THE INVENTION

The present invention thus attempts to overcome one or more of the problems associated with the prior art ball and fluid bearing supported spindles as described above, and provide a spindle motor structure that is more suitable for magnetic disk drives with enhanced system performance, particularly for high load, high speed applications.

Accordingly, in one aspect this invention provides an electric spindle motor comprising a base assembly, a hollow rotatable hub housing a motor, said hub being mounted for co-joined rotation with a central shaft about a rotational axis, a stator mounted with said base assembly and disposed within said hub a liquid filled journal bearing acting between said shaft and said base assembly to provide radial support of said hub, and a gas filled thrust bearing acting between said hub and said base assembly to provide at least axial support of said hub.

Preferably, the base includes a cylindrical sleeve which extends coaxially of the shaft and houses the journal bearing. The journal bearing is preferably formed between the exterior surface of the shaft and the interior surface of the sleeve. A dynamic pressure generating groove pattern is preferably formed on either or both of the surfaces forming the bearing. The liquid lubricant used in the bearing preferably has a viscosity of about 4 cSt at 100° C. A non-contact surface tension liquid seal is preferably used to contain the liquid within the journal bearing. The seal is preferably formed by an outwardly tapered portion of the interior surface of the cylindrical sleeve. An antimigration coating is also preferably applied adjacent the seal.

The thrust bearing preferably includes a thrust plate having a thrust surface extending outwardly from the rotational axis and a correspondingly shaped first bearing surface spaced apart from the first thrust surface by first bearing clearance. Preferably, the thrust plate is a double sided tapered bearing, which also provides a second thrust surface extending outwardly from the rotational axis and a correspondingly shaped second bearing surface. Preferably, the thrust surfaces and/or bearing surfaces are provided with groove patterns to improve bearing performance. An air passage is preferably provided to allow smooth circulation of air flow to the bearing and prevent stagnation. A seating configuration is preferably provided using wear resistant material to protect the bearing surfaces during starting and stopping of the spindle motor.

The spindle motor of this invention is able to achieve an extremely low level of non-repeatable runout and thereby increase the recording density of an associated disk drive. Additionally, the bearing systems have a relatively low wear rate and a very low level of noise and vibration compared with conventional ball bearing systems. The bearing system can provide sufficient radial and axial stiffness for the spindle in any orientation of the spindle axis. The effective seal mechanism of the preferred embodiment ensures that the bearing system is free from the risk of lubricant leakage.

It will also be apparent that the tapered thrust bearing of the preferred embodiment provides axial load capability for the spindle motor and also partially supports the radial load. The extra stiffness in the radial direction provided by tapered thrust bearing increases the stability of the spindle particularly when the radial load of the spindle is very small, for example, when the spindle axis is vertically oriented.

BRIEF DESCRIPTION OF THE DRAWINGS

The invention will now be described, by way of example only, with reference to the accompanying drawings in which:

FIG. 5 is an alternative thrust bearing design for the embodiment of the present invention.

BEST MODE FOR CARRYING OUT THE INVENTION

Figure 2:
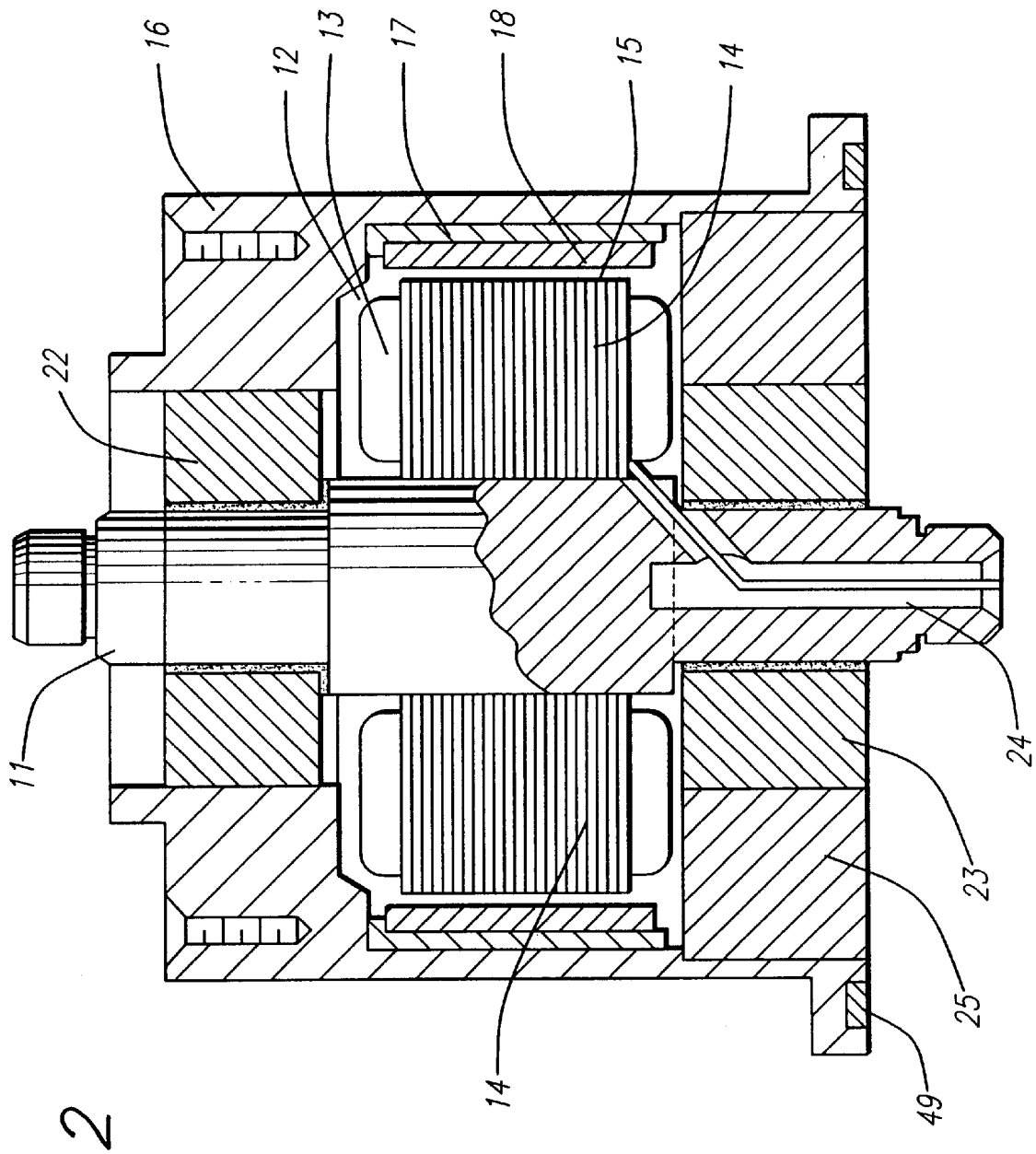
FIG. 2 is a cross-sectional view of an embodiment of the prior art disk drive spindle.

For better understanding of the basic principle on which the disk drive spindle operates, a conventional spindle structure is first described. FIG. 2 shows cross-sectional view of a prior art disk drive spindle which employs ball bearing technology. The basic configuration of this spindle motor assembly is known as "in-spindle motor", in which the motor components are located completely inside the spindle hub. This type of spindle is typically used for disk drives having a relatively larger number of disk platters, eg: 4 platters or more. As illustrated in FIG. 2 the common motor configuration for disk drives includes a brushless dc motor, having an outer rotor with permanent magnet poles, resides inside the hub. The spindle motor unit comprises a cylindrical steel shaft 11 which is fitted with a stator 12 consisting of the lamination core 14 and armature windings 13. A rotatable hub 16, preferably made of aluminum alloys, has a cylindrical hole running through it to receive the ball bearing 22 at the top end, and the sleeve 25 which in turn supports the bearing 23 at the bottom end of the spindle. Inside the hub 16 and between the ball bearings 22 and 23, there is a cavity where the stator resides. An air gap 15 is formed between the outer surface of the stator core 14 and the inner surface of the ring-shaped magnetic poles 18 which is attached to the rotor back iron 17, typically made of ferromagnetic material such as low carbon steel is to provide the magnetic path for the electric motor. The terminal leads of the armature windings 13 are led out of the cavity of the hub 16 through the passage way 24 in the centre of the shaft 11 and are connected to the power supply of the disk drive via a motor control circuit of known kind (not shown). The hub 16 may also have a magnetic flux ring or the commutator 49. The signals regarding to the position of the rotating hub assembly is produced by the commutator during operation and picked up by Hall sensors feeding to the control circuit. However, the commutator will be unnecessary if a sensorless drive circuit is used for the spindle unit. When the armature winding 13 is energised according to the control logic used to regulate the speed of the spindle, an electromagnetic torque is developed by the interaction between magnetic fields due to the magnet poles and the armature currents, respectively, and causes rotation movement of the spindle.

Figure 1:
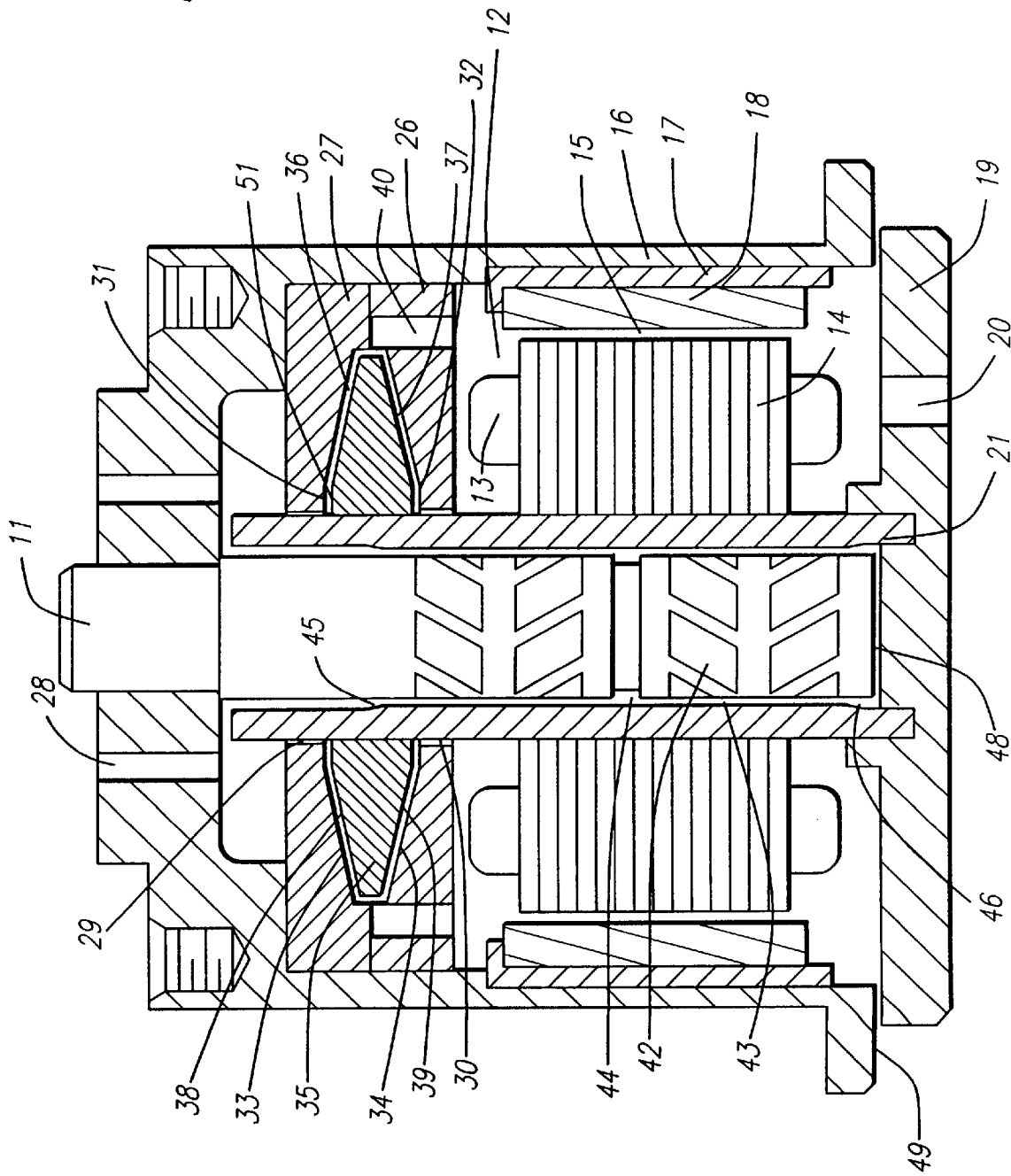
FIG. 1 is a cross-sectional view of an embodiment according to the present invention.

Referring to FIG. 1, a cross-section view of an embodiment of the present invention is illustrated. The basic elements of the electric motor and the principle of its operation for the spindle assembly shown in FIG. 2 are essentially the same as the conventional ball bearing spindle, shown in FIG. 2. The bearing system of the preferred embodiment comprises an air-lubricated, conical thrust bearing with spiral grooves, and a liquid-lubricated journal bearing with herringbone grooves and a surface tension seal to confine the lubricant.

As shown in FIG. 1, a cylindrical shaft 11 is fitted to the rotatable hub 16. The shaft has a journal bearing portion 42. A mating bearing surface 43 is formed on the inner surface of a stationary cylindrical sleeve extending from a base plate 19. Shaft 11 has slightly smaller diameter than the inner diameter in the journal bearing portion of sleeve 21, thus forming a bearing clearance 44 which is typically in a range of 2–15 micrometres depending primarily on the actual load of the spindle system. The journal bearing will be described in detail below with reference to FIG. 4. The bottom end of the sleeve 21 is fitted on to the base plate 19 which has a through hole 20 for the terminal leads of the armature windings. A thrust bearing plate 35 is mounted coaxially onto the other end of the sleeve. Also the stator 12 of the electric motor is mounted onto the stationary sleeve in the cavity of the cylindrically hollow hub 16. The rotor of the electric motor including magnetic poles 18 and back iron 17, is fitted to the hub 16 and faces the stator core 14.

Figure 3A:
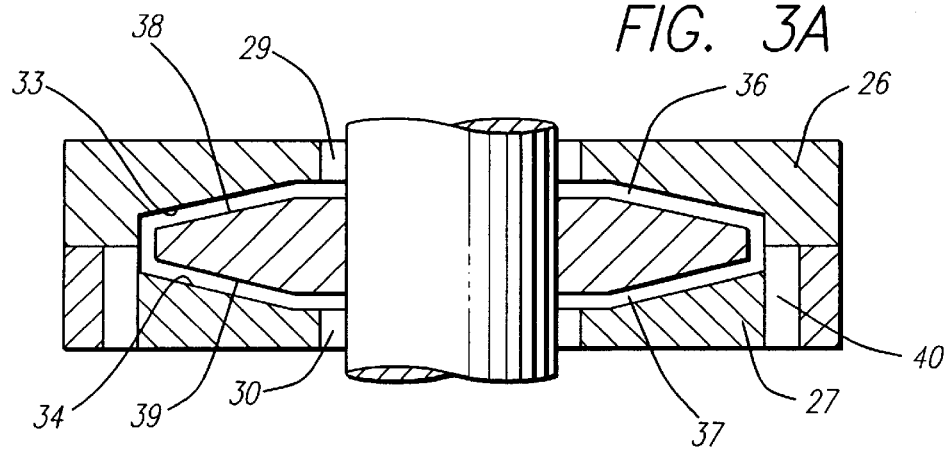
FIG. 3(a) is a detailed cross-sectional view of the air lubricated thrust bearing.
Figure 3B:
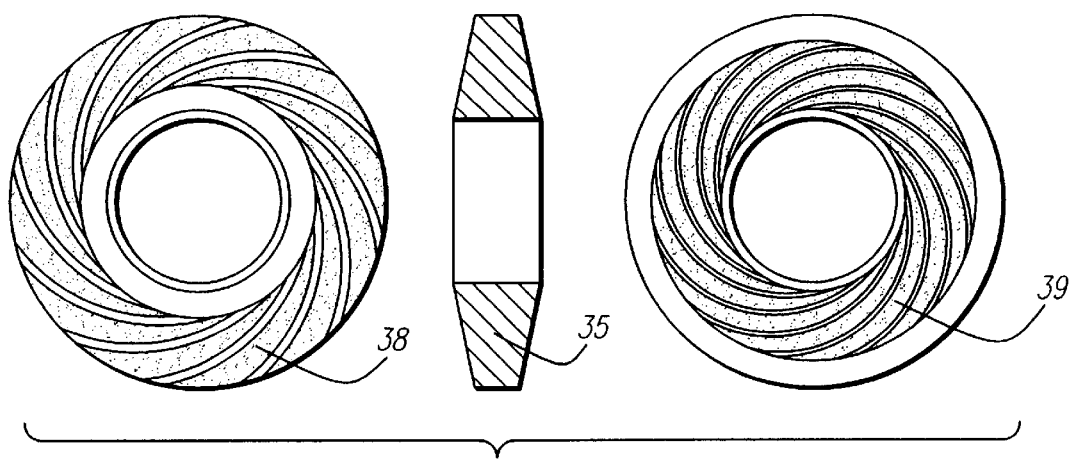
FIG. 3(b) is the groove patterns on upper and lower surfaces of thrust plate with pumping-in grooves on one surface and pumping-out grooves on the other.
Figure 3C:
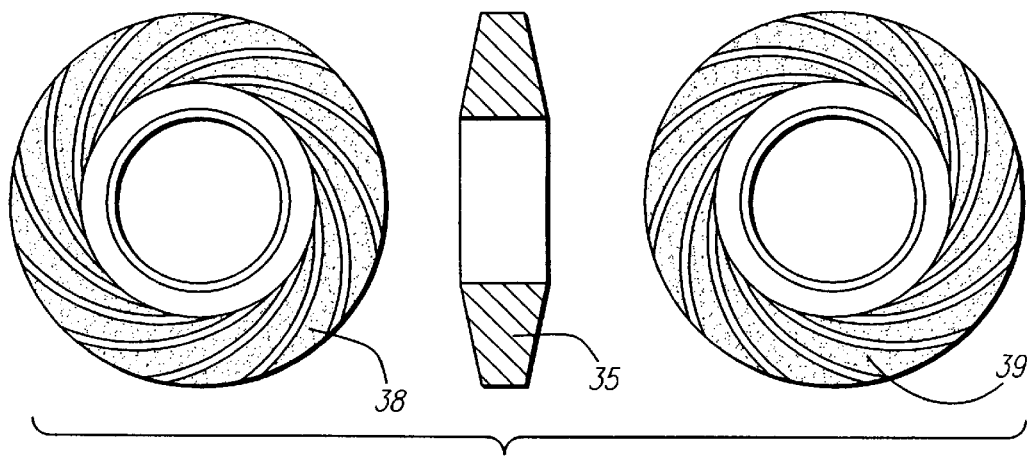
FIG. 3(c) is the groove patterns on the upper and lower surfaces of the thrust plate with pumping-in effect grooves on both surfaces.

The spindle unit of FIG. 1 further comprises a pair of identical, tapered thrust bearing sleeve members 26 and 27 attached to the inner surface of the hub 16. The inner surfaces 33 and 34 of the tapered sleeve member 26 and 27 are the mating surfaces for the thrust bearing plate 35 having bearing surfaces 38 and 39, as shown in FIG. 3(a), which illustrates the details of the air lubricated thrust bearing. Inside dimensions of the upper and lower thrust bearing members 26 and 27 are slightly larger than the outside dimensions of the tapered thrust plate 35. This results in gaps 36 and 37 for the thrust bearing. The tapered surfaces 33, 34, 38 and 39 of the respective surfaces of the double sided thrust bearing make an angle of 12.5° with respect to the horizontal axis. Groove patterns are provided at the surfaces 38 and 39 of the thrust plate 35 in order to enhance the hydrodynamic pressures generated during operation. The spiral groove patterns at the surfaces 38 and 39 can be designed to produce inward-pumping effects for the air flow in the clearances 36 and 37 as shown in FIG. 3(b). Alternatively they can be designed to generate inward-pumping effect for one side of the thrust bearing and outward-pumping effect for the other as shown in FIG. 3(c). In the present embodiment, the surfaces 31 and 32 of the tapered sleeves for the thrust bearing are coated with anti-wear material, eg: silicon nitride ($Si_3N_4$) silicon carbide (SiC), alumina ($AL_2O_3$) or the like, to provide protection for the bearing surfaces during starting/stopping processes. As shown in FIG. 1, a passage way 28 is made at the top end of the hub 16. Together with the passage ways 29, 30 and 40, this provides a smooth circulation of air flow for double sided thrust bearing.

Figure 4:
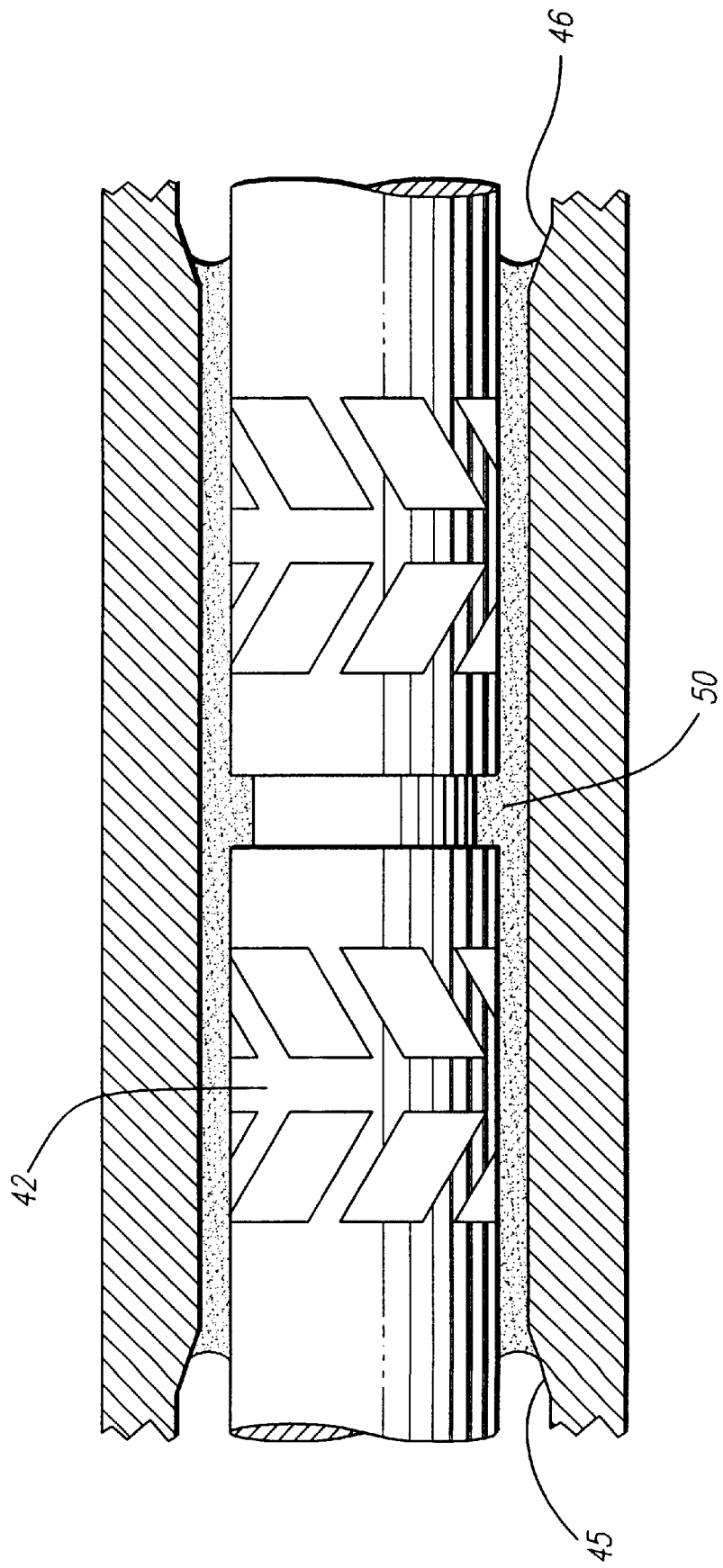
FIG. 4 is a cross-sectional view of grooved journal bearing with its tapered seal.

Referring now to FIG. 4, the two surfaces of the journal bearing are separated by a film of liquid lubricant 50. A hydrodynamic pressure will be generated in this journal bearing during operation to support the journal load. Herringbone grooves are provided for this portion of the shaft, in this particular embodiment, to enhance the performance of the bearing, particularly the stiffness. In the spindle assembly, a surface tension dynamic seal or otherwise known as capillary seal is used to confine the lubricant within the active portion of the journal bearing. The surface tension sealing is realised by the tapered surfaces 45 and 46 formed at the inner surface of the sleeve 21 near two ends of the journal bearing, as shown in FIG. 1. Since it is a non-contact type of seal, the associated power loss is very low.

The operation of the spindle motor will be described for two typical dispositions, i.e. when the spindle axis is vertical and horizontal.

When the spindle axis is vertically oriented as shown in FIG. 1, at rest position, the rotating system sits on surface 51 of the thrust plate with surface 31 of the thrust bearing sleeve. A wear resistant material such as described above is coated on the surface 31 by physical or chemical vapor deposition to reduce the wear during starting and stopping. In the start-up process, the load due to the rotating member is initially supported on surface 51. As the motor speeds up, surface 31 loses contact with its sliding surface 51, and the weight of the rotating hub assembly, which includes weight of hub 16, the shaft 11, the tapered sleeves for the thrust bearing and the disk platters, is supported by the hydrodynamic pressure developed in gap 37. A hydrodynamic pressure is also developed during operation in the gap 36 between the bearing surface 33 of the upper thrust bearing 27 and the surface 38 of the thrust plate. This hydrodynamic pressure together with the total load of the rotating hub assembly and the hydrodynamic pressure developed in the gap 37 between bearing surfaces 34 and 39, defines the working film thickness and therefore the position of the thrust plate within the upper and lower thrust bearings. In addition to supporting the load in the axial direction, the hydrodynamic pressure also has radial component which can contribute to the radial stiffness of the spindle when the shaft is vertically-oriented and the radial load is very small. When the spindle is placed in the up-side down position with the base plate facing upwards, the wear resistance surface 31 provides the sitting for the rotatable hub assembly, and during operation the weight will be supported by the hydrodynamic pressure developed in the gap 36 between the surface 33 of the thrust bearing 27 and the surface 38 of the thrust plate 35. In FIG. 3(a), the passage way 40 for air circulation is also illustrated.

When the spindle axis is horizontally oriented, the weight of the whole rotating hub assembly is supported by the hydrodynamic pressure developed in the journal bearing which has herringbone grooves, and the hydrodynamic pressure developed in the double sided thrust bearing. At this position, the conical thrust bearing can provide axial stiffness for the spindle unit.

FIG. 5 is a cross-sectional view of an alternative embodiment of the present invention. In this spindle structure the thrust bearing plate 35 is designed with flat surfaces at both ends having hydrodynamic pressure generating grooves. With this spindle structure, the thrust bearing does not produce extra stiffness in the zero load direction, i.e. the radial direction when the spindle axis is vertically oriented, or the axial direction when the spindle axis is horizontally oriented. However, the manufacturing complexity and therefore costs for a flat thrust bearing member with groove patterns are much lower than those for a conical thrust bearing.

Although the present invention has been described with reference to a preferred embodiment, it will be apparent to those skilled in the art that changes and modifications may be made in form and detail without departing from the spirit and scope of the invention.

We claim:

1. An electric spindle motor, comprising:
   a base plate;
   a stationary sleeve extending substantially perpendicular from said base plate along a rotational axis;
   a shaft extending within said sleeve along said rotational axis and spaced apart therefrom to define a first clearance gap;
   a liquid fluid situated within said first clearance gap for providing at least radial stiffness for said shaft;

a rotatable housing situated in a manner that forms a cavity between said housing and said base plate, said shaft and said sleeve being situated within said cavity;

a stator situated within said cavity and coaxially around said shaft and stationary sleeve;

a plate situated within said cavity and extending radially outward from said stationary sleeve;

a rotatable sleeve situated within said cavity and extending radially inward from said housing, said rotating sleeve including upper and lower surfaces that are complementary shaped with upper and lower surfaces of said plate and spaced apart therefrom to form a second clearance gap; and a gas fluid situated within said second clearance gap for providing at least axial stiffness for said shaft.

2. The electric spindle motor of claim 1, wherein the surface of said shaft is grooved for increasing the hydrodynamic pressure of the liquid fluid for improved radial stiffness of said shaft.

3. The electric spindle motor of claim 2, wherein the grooves on the surface of said shaft are arranged in a herring bone pattern.

4. The electric spindle motor of claim 1, wherein the surface of said stationary sleeve is grooved for increasing the hydrodynamic pressure of the liquid fluid for improved radial stiffness of said shaft.

5. The electric spindle motor of claim 2, wherein the grooves on the surface of said stationary sleeve are arranged in a herring bone pattern.

6. The electric spindle motor of claim 1, wherein said first clearance gap is between 4 and 20 micrometers.

7. The electric spindle motor of claim 1, further including a non-contact surface tension liquid seal for preventing leakage of said liquid fluid.

8. The electric spindle motor of claim 7, wherein said seal is formed by an outwardly divergent portion of the interior of said stationary sleeve near an end of said stationary sleeve.

9. The electric spindle motor of claim 8, wherein said outwardly divergent portion is a conical taper.

10. The electric spindle motor of claim 7, wherein said non-contact seal is aided by an antimigration coating over an inner surface of said stationary sleeve.

11. The electric spindle motor of claim 1, wherein at least upper or lower surfaces of said plate and said rotatable sleeve are inclined with respect to a normal to the rotational axis.

12. The electric spindle motor of claim 11, wherein both upper and lower surfaces of said plate and said rotatable sleeve are oppositely inclined on either side of the normal to the rotational axis.

13. The electric spindle motor of claim 1, wherein at least one of said upper and lower surfaces of said plate and said rotatable sleeve include a groove pattern to provide gas flow through said second clearance gap and to provide axial stiffness of said shaft.

14. The electric spindle motor of claim 13, wherein said groove pattern includes a spiral and/or a herring bone pattern.

15. The electric spindle motor of claim 1, wherein said plate is tapered to have a reducing cross section in the radially outward direction.

16. The electric spindle motor of claim 1, wherein said upper and lower surfaces of said plate and/or said upper and lower surfaces of said rotatable sleeve include a groove pattern for causing gas flow through said second clearance gap.

17. The electric spindle motor of claim 16, wherein said groove pattern includes a spiral and/or a herring bone pattern.

18. The electric spindle motor of claim 16, wherein said groove pattern is arranged to produce an inward gas flow within said second clearance gap.

19. The electric spindle motor of claim 16, wherein said groove pattern is arranged to produce an inward gas flow within said second clearance gap situated between respective upper surfaces of said plate and said rotatable sleeve and outward gas flow within said second clearance gap between respective lower surfaces of said plate and said rotatable sleeve.

20. The electric spindle motor of claim 16, wherein said groove pattern is arranged to produce an inward gas flow within said second clearance gap situated between respective lower surfaces of said plate and said rotatable sleeve and outward gas flow within said second clearance gap between respective upper surfaces of said plate and said rotatable sleeve.

21. The electric spindle motor of claim 16, wherein said rotatable sleeve includes passageways for providing circulation of gas within said second clearance gap.

22. The electric spindle motor of claim 1, wherein said plate is attached to said stationary sleeve.

23. The electric spindle motor of claim 1, wherein said stationary sleeve is attached to said base plate.

24. The electric spindle motor of claim 1, wherein said plate is annular and surrounds said stationary sleeve.

25. The electric spindle motor of claim 1, wherein said gas fluid is air.

26. The electric spindle motor of claim 1, wherein said housing includes an opening for the admission of gas fluid into said second clearance gap.

27. The electric spindle motor of claim 1, wherein at least one surface of said plate and/or said rotatable sleeve includes a layer of wear resistance material for protecting said one surface.

28. The electric spindle motor of claim 1, wherein said first clearance gap is between 2 and 15 micrometers.

29. The electric spindle motor of claim 1, wherein said second clearance gap is between 2 and 15 micrometers.

30. The electric spindle motor of claim 1, wherein said rotable housing is coupled to said shaft for rotation therewith.

31. An electric motor, comprising:

a first sleeve;

a shaft extending within said first sleeve along a rotational axis and spaced apart therefrom to define a first clearance gap;

a liquid fluid situated within said first clearance gap for providing at least radial stiffness for said shaft;

a stator situated coaxially around said first sleeve and shaft;

a stationary plate having upper and lower surfaces;

a second sleeve including a groove that is complementary shaped with upper and lower surfaces of said plate and spaced apart therefrom to form a second clearance gap; and a gas fluid situated within said second clearance gap for providing at least axial stiffness for said shaft.

32. A spindle motor comprising:

a stationary base;

a shaft extended from the said base;

a first rotatable sleeve extending with said shaft along a rotational axis and spaced apart therefrom to define a first clearance gap;

a liquid lubricant filled in said first clearance gap for providing at least radial stiffness for said first rotatable sleeve, the said lubricant is confined by a non-contact sealing;

a housing coupled to said rotatable sleeve for rotation therewith and in a manner that forms a cavity between said housing and said base plate, said shaft and sleeve being situated within said cavity;

a stator attached to said base and situated within said cavity coaxially around said shaft;

a thrust having upper and lower surfaces and extending radially outwards from said shaft;

a second rotatable sleeve situated within said cavity and extending radially inward from said housing, said rotating sleeve including upper and lower inner surfaces that are complementary shaped with upper and lower surfaces of said plate and spaced apart therefrom to form a second clearance gap, and a gas fluid situated within said second clearance gap for providing at least axial stiffness for said shaft.

* * * * *